United States Patent [19]

Harris et al.

[11] Patent Number: 4,473,089

[45] Date of Patent: Sep. 25, 1984

[54] AIR CONDITIONING CONTROL SYSTEM WITH MASTER AND TRACKING CONTROLLERS

[75] Inventors: William J. Harris, Tuhannock; William J. Waeldner, Waverly, both of Pa.

[73] Assignee: Anemostat Products Division, Dynamics Corporation of America, Scranton, Pa.

[21] Appl. No.: 558,992

[22] Filed: Dec. 7, 1983

Related U.S. Application Data

[60] Continuation of Ser. No. 501,752, Jun. 9, 1983, abandoned, which is a continuation of Ser. No. 343,390, Jan. 28, 1982, abandoned, which is a continuation of Ser. No. 232,152, Feb. 6, 1981, abandoned, which is a division of Ser. No. 148,751, May 12, 1980, Pat. No. 4,284,237.

[51] Int. Cl.³ ............................................. G05D 11/03
[52] U.S. Cl. .................................. 137/100; 92/13.51; 92/48; 92/97
[58] Field of Search ....................... 137/98, 100; 92/48, 92/64, 117 R, 119 A, 13.2, 13.51, 97; 73/4 R

[56] References Cited

U.S. PATENT DOCUMENTS

| | | | |
|---|---|---|---|
| 1,333,986 | 3/1920 | Lundgaard | 137/100 |
| 1,558,529 | 10/1925 | Wunsch | 137/100 |
| 1,673,872 | 6/1928 | Huessener | 137/100 |
| 1,999,740 | 4/1935 | Schmidt et al. | 147/100 |
| 3,089,680 | 5/1963 | Deve | 92/117 R X |
| 3,103,228 | 9/1963 | Davenport | 137/98 |

*Primary Examiner*—William E. Tapolcai
*Attorney, Agent, or Firm*—McCormick, Paulding & Huber

[57] ABSTRACT

An air conditioning control system for at least two duct sections each with an associated damper comprises at least one master controller for a first pneumatic actuator for one damper and at least one tracking controller for a second pneumatic actuator for the other damper. The master controller comprises a first flow sensor producing a first flow variable signal in response to a sensed flow in the duct section associated with the said one damper. An adjustable reference or bias signal means is provided and a temperature signal is combined therewith to provide a composite signal for comparison with the flow variable signal. A resultant signal after comparison operates the first pneumatic actuator for the said one damper. A tracking controller comprises a second flow sensor producing a second flow variable signal in response to sensed flow in the duct section associated with the other damper. A second signal comparison and transmitting means receives the first and second flow variable signals, compares the two and transmits a second resultant signal to the second pneumatic actuator for control of the said other damper. The second comparison means includes a pivotally mounted lever acted upon by diaphragm actuated first and second push rods representing the first and second flow variable signals. One of the diaphragm assemblies is mounted for slidable adjustment along the lever to vary the relative mechanical advantage and to vary the flow ratio between the two dampers and duct sections.

2 Claims, 3 Drawing Figures

AIR CONDITIONING CONTROL SYSTEM WITH MASTER AND TRACKING CONTROLLERS

This application is a continuation of application Ser. No. 501,752, filed June 9, 1983, now abandoned, which is a continuation of application Ser. No. 343,390, filed Jan. 28, 1982, now abandoned, which is a continuation of application Ser. No. 232,152, filed Feb. 6, 1981, now abandoned, which is a division of application Ser. No. 148,751, filed May 12, 1980, now U.S. Pat. No. 4,284,237.

BACKGROUND OF THE INVENTION

Conventional controllers in air conditioning systems may be of the general type shown in: U.S. Pat. No. 4,077,567, entitled Pneumatic Temperature Reset Differential Pressure Controller; and U.S. Pat. No. 4,042,173, entitled Method and Apparatus for Controlling Volume Air Flow. Generally such controllers are of the pneumatic type and employ duct or independent supply air in the control and operation of a pneumatic actuator which moves a flow regulating damper in response to the demands of the controller. A differential pressure across a fixed orifice is conventionally employed to provide a flow variable signal representing flow in the duct section associated with the damper, the differential pressure being applied across a diaphragm for operating a push rod or other output member in a pneumatic-mechanical motion transducer. The push rod is operatively associated with a pivotally supported lever which is also influenced by a reference or bias signal provided by an adjustable reference means normally in the form of a spring engaging the lever. When temperature control or temperature reset is introduced, a pneumatic thermostat is usually employed with a pneumatic-mechanical motion transducer having a push rod or other output member acting in opposition to a bias or reset spring. The temperature or other air condition signal is combined with the aforesaid reference or bias signal to provide a composite signal acting on the lever in opposition to the push rod or other output member of the flow or differential pressure transducer. The temprature or other air condition control or reset signal may be transmitted to the reference or bias spring by a second pivotally supported lever.

The first mentioned lever of the controller provides a resultant signal at a control orifice which may comprise a flow variable signal compared against a reference or bias signal or a flow variable signal compared against a composite signal comprising the reference or bias signal and a temperature or other air condition signal. The control orifice thus establishes a pneumatic actuator operating pressure for movement and control of the damper for the maintenance of desired flow or volume conditions in the duct and for reset operation in accordance with the temperature or other air condition signal.

Controllers of the type described operate efficiently in regulating conditions in a single duct, mixing or air distribution box. They do not, however, efficiently meet requirements where two or more duct sections, mixing or distribution boxes must be coordinated in their air flow or volume control. For example, where supply and exhaust ducts or boxes require coordinated flow control, independent control by two or more controllers of the type described may result in excessive variation and departure from the desired coordinated flow conditions. Reference or bias and reset springs, lever pivot friction, transducer push rod friction, etc., result in inaccuracies unacceptable for certain applications. Further, the necessary flexibility in coordinating air flow or volume is lacking. A one-to-one flow rate might be practical with a pair of independent controllers if ideal conditions prevail in the design and manufacture of the controllers but various other flow ratios would be difficult if not impossible to achieve with the necessary degree of accuracy. Many applications require flow ratios other than one-to-one.

It is the general object of the present invention to provide an improved air conditioning control system employing a master controller of the type described in combination with a tracking controller capable of closely and accurately following the operation of the master controller and its actuator and damper and capable further of convenient adjustment of flow ratios between the dampers and duct sections, mixing and/or distribution boxes associated with the two controllers.

A further object of the invention resides in the provision of a tracking controller capable of use with a variety of types of master controllers and in other systems without master controllers but where coordinated flow in two or more duct sections is required.

SUMMARY OF THE INVENTION

In fulfillment of the foregoing objects, an air conditioning control system is provided with master and tracking controllers capable of coordinated operation with a high degree of accuracy and with adjustability of flow ratios readily achieved in a simple mechanical operation. The master controller has a first pneumatic actuator associated therewith for operating a first damper in a first duct section, mixing or distribution box, etc. A first flow sensor reads differential pressure across a fixed orifice in the duct section and thus produces a first flow variable signal in response to sensed flow in the duct section. An adjustable reference or bias signal means is provided and a first signal comparison and transmitting means receives the two signals and provides a first resultant signal to a first actuator for operation thereof and for corresponding movement of the first damper in response thereto.

The tracking controller comprises a second flow sensor which reads differential pressure across an orifice in a second duct section and thus produces a second flow variable signal in response to the sensed flow in the duct section. A second signal comparison and transmitting means receives the first and second flow variable signals, compares the same, and transmits a second resultant signal to a second actuator for operation thereof and for a corresponding movement of a second damper in the second duct section.

Thus, the pressure differential or flow maintained in the first duct section by the master controller is employed as a reference in the tracking controller against the differential or flow in the second duct section. Accurate tracking operation is thus provided for and the desired coordinated operation of the controllers and their actuators and dampers results. Temperature or other air condition signals may also be introduced to the master controller and the effect thereof upon flow in the first duct section will be reflected through the tracking controller to the flow in the second duct section.

When the tracking controller is used without a master controller, close coordination of flow in two or more duct sections is achieved irrespective of factors affecting flow conditions in a selected master duct.

Adjustability of the effect of the first and second flow variable signals on the resultant signal in the tracking controller is provided for so that desired flow ratios may be established between two duct sections, boxes, etc., with the tracking operation of the controller serving to maintain such ratios despite changing flow conditions in the first duct section or box.

PREFERRED EMBODIMENTS OF THE INVENTION

Figure 1:
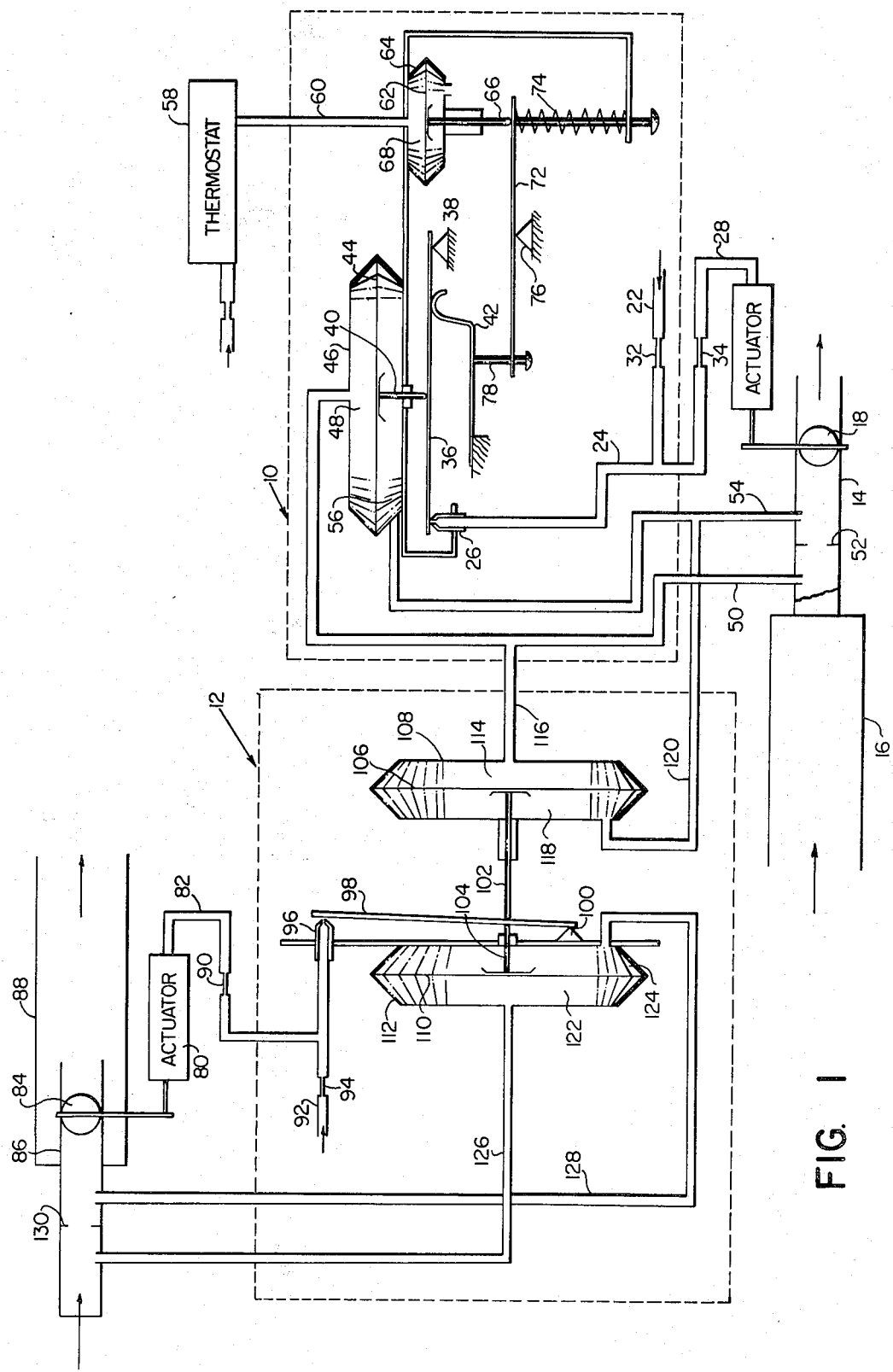
FIG. 1 of the drawings is a schematic illustration illustrating master and tracking controllers and associated elements in an air conditioning system.

Referring to FIG. 1 a master controller is indicated generally at 10 and a tracking controller at 12. A first duct section 14 shown exiting from a mixing or distribution box 16 has a damper 18 disposed therein and operated by a pneumatic actuator 20. A supply of actuator and control air is introduced from a regulated source at 22 and a conduit 24 extends to control orifice 26 within the controller 10. The supply conduit 22 also has a branch conduit 28 extending to actuator 20 and restrictions 32, 34 are provided respectively in the conduits 22, 28. Restriction 32 permits pressure change to occur within the actuator 20 reflecting the out flow condition at control orifice 26 while restriction 34 may serve a damping function with regard to operation of the actuator 20.

The pressure established in actuator 20 responsive to the out flow condition at control orifice 26 may be regarded as a "resultant signal" operating the actuator 20 and the damper 18 within the duct section 14. Control of the out flow at the orifice and actuator pressure is provided for by a first lever 36 pivoted at 38 and acted upon by push rod or output member 40 and leaf spring 42. The push rod 40 responds to a diaphragm 44 in a diaphragm assembly 46 comprising a pneumatic-mechanical motion transducer. Upper chamber 48 in diaphragm assembly 46 receive air under pressure from duct 14 via conduit 50 upstream of a fixed orifice 52 in the duct section. Conduit 54 carries air under pressure from the downstream side of the orifice 52 to lower chamber 56 in the diaphragm assembly 46. Thus, it will be apparent that a differential pressure or flow variable signal is provided to the diaphragm assembly 46 for conversion to a mechanical motion signal at the push rod 40.

The spring 42 comprises an adjustable reference or bias spring acting in opposition to the push rod 40 and forms a part of a signal comparison and transmitting means for comparing the flow variable signal against the reference or bias signal and for establishing a lever position and out flow condition at the control orifice 26.

An air condition signal is preferably also employed in operation of the master controller 10 and a thermostat 58 may be of a conventional pneumatic type and situated in a room or other space conditioned by air supplied or exhausted by the duct section 14. An air pressure or pneumatic signal in conduit 60 represents an air condition signal applied to diaphragm 62 in diaphragm assembly 64 and converted to a mechanical motion signal at push rod or output member 66. The air pressure signal acts in upper chamber 68 and may be opposed by atmospheric pressure in lower chamber 70 of the diaphragm assembly or pneumatic-mechanical motion transducer. Push rod 66 engages a lever 72 in opposition to a spring 74 which may be referred to as a temperature or air condition reset spring. The lever 72 is pivoted at 76 and connected at an opposite end portion with spring engageable member 78.

From the foregoing it will be apparent that a temperature or other air condition signal is provided and is effected through a signal combining means comprising push rod 66, reset spring 74, lever 72, element 78, at the leaf spring 42 whereby to provide a composite signal to the first lever 36. That is, the composite signal of the leaf spring 42 includes the reference or bias signal of the spring and the temperature or other air condition signal. Adjustment may be provided at the element 78 and the reset spring 74.

As will be apparent, the master controller 10 will operate to establish and maintain a flow condition in the duct section 14 in accordance with the adjusted position of the element 48 and the spring 42. In the event of varying supply or upstream pressure, the controller will act to maintain the desired flow condition and, when temperature or other air condition control is included as illustrated, the flow will be reset in accordance with the temperature or other condition signal as reflected in the composite signal reaching the lever 36 via the spring 42. Efficient flow or volume control is thus exercised in the duct section 14.

The tracking controller 12 operates a second pneumatic actuator 80 in accordance with a second "resultant signal" in line 82 to control the position of a second damper 84 in a duct section 86 entering a mixing or distribution box 88. The conduit 82 includes a restriction 90 and extends to a supply conduit 92 including a restriction 94. The supply conduit 92 receives a regulated supply of actuator and control air and extends to a second control orifice 96 associated with a second control lever 98. The lever 98 is pivoted at 100 and is acted upon and in opposition by first and second push rods or output members 102, 104. The push rod 102 is controlled by diaphragm 106 in diaphragm assembly 108 and the push rod 104 is controlled by a diaphragm 110 in diaphragm assembly 112. Right hand chamber 114 in the diaphragm assembly 108 receives air under pressure from branch conduit 116 extending from the aforementioned conduit 50 on the upstream side of fixed orifice 52 in duct section 14. Lefthand chamber 118 in the diaphragm assembly or pneumatic-mechanical motion transducer 108 receives air under pressure from a conduit 120 extending to the aforementioned conduit 54 opening on the downstream side of fixed orifice 52 in duct section 14. Thus, the push rod 102 reflects a flow variable signal for the first duct section 14.

The push rod 104 reflects a second flow variable signal for the duct section 86 and has left and right hand chambers 122 124 respectively connected with conduits 126 and 128. The conduit 126 extends to the upstream side of a fixed orifice 130 in the second duct section 186 and the conduit 128 opens in the duct section 186 at the downstream side of the said fixed orifice.

As will be apparent, the flow in the duct section 14 as established by the master controller 10 will serve as a reference for the tracking controller 12, said flow being reflected at the push rod 102 in the mechanical motion form of the first flow variable signal. The push rod 104 reflects in mechanical motion form the second flow variable signal of the duct section 86 and such signals act in opposition on the lever 98 whereby they are compared and transmitted by such second signal comparison and transmitting means to provide a second resultant signal at the control orifice 96 and the conduit 82 to the actuator 80. The restriction 94 permits the control orifice 96 to establish air pressure as a resultant signal in the line 82 and the restriction 90 may serve a damping function. The actuator 80 in turn controls the damper 84 in the second duct section 86 as established by the tracking controller.

As will be apparent the tracking controller 12 will operate to efficiently track the flow condition in the duct section 14 and to establish and maintain a coordinated flow condition in the second duct section 86. The flow ratio may be one-to-one or may be established at other desired ratios by adjustment means to be described hereinbelow. As illustrated, the duct section 86 and the mixing or distribution box 88 may for example be on the supply side of a laboratory or other space requiring a negative pressure with respect to surrounding area. The box 16 and duct section 14 may for example be disposed on the exhaust side of the laboratory space and the two boxes or duct sections may be set up to provide for shut off of the supply side and full open conditions at the exhaust side in the event of failure of actuator and control air to the controllers. Thus, negative pressure will be maintained as desired in the laboratory space during operation of the controllers and even on failure thereof.

Figure 2:
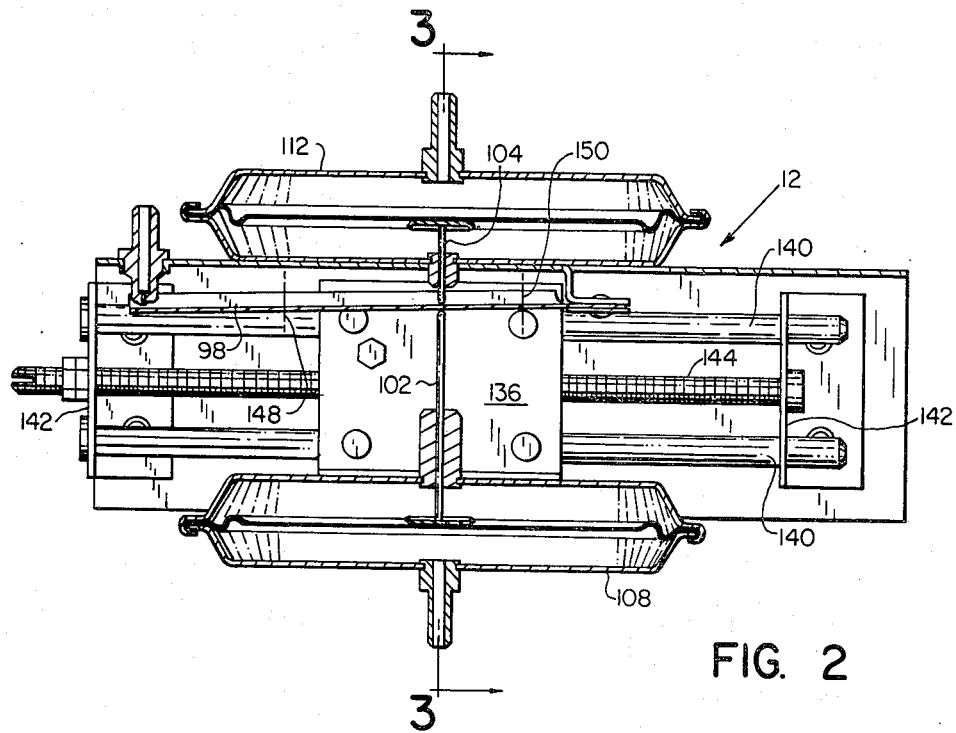
FIG. 2 is a top view of a tracking controller constructed in accordance with the present invention, diaphragm assemblies thereof being partially broken away.
Figure 3:
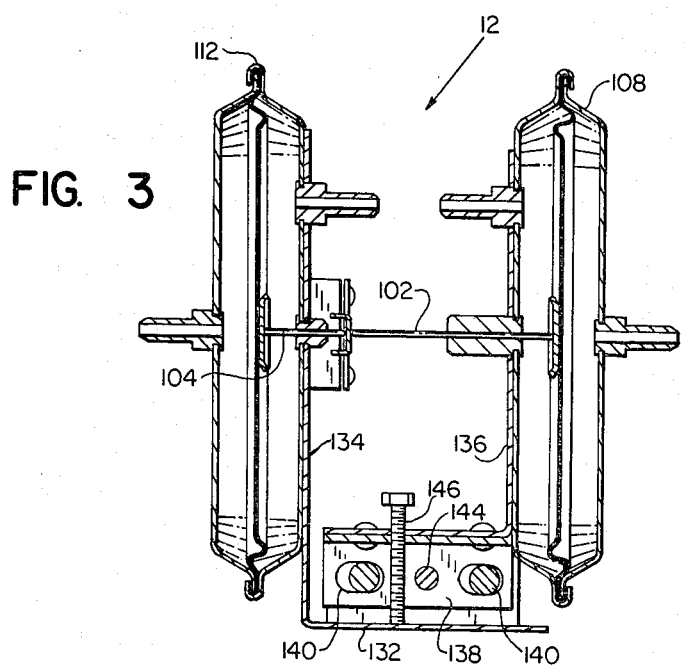
FIG. 3 is a vertical sectional view of the controller taken generally as indicated at 3—3 in FIG. 2.

Referring now particularly to FIGS. 2 and 3, it will be observed that the mechanical embodiment of the tracking controller 12 includes a base member 132 directly supporting diaphragm assembly 112 by means of a bracket 134. The base member 132 also indirectly supports the diaphragm assembly 108 by means of a sliding bracket 136. The sliding bracket 136 has depending flanges 138 at each end thereof which slidably receive first and second slides or slide rods 140, 140. The slide rods 140, 140 are secured at end portions in brackets 142, 142 and a lead screw 144 may be provided for ease and convenience in adjustment of the bracket 136 along the rods. The lead screw 144 is journaled in the brackets 142, 142 and threadably received in the flanges 138, 138 so that rotation thereof will result in translation of the bracket 136. A binder screw 146 serves to secure the bracket 136 in an adjusted position along the base or frame member 132.

As will be apparent, the diaphragm assembly 108 may be adjusted along the length of the base of the frame member 132 on the bracket 136 so as to adjust the position of its push rod 102 along the length of lever 98, FIG. 2. As shown, the push rod 102 is aligned with an opposite push rod 104 and this provides for a one-to-one flow ratio when the tracking controller 12 is used in combination with a master controller 10 as illustrated and described in FIG. 1. Line 148 in FIG. 2 illustrates the position of the push rod 102 for a two-to-one flow ratio and line 150 illustrates the position of the push rod for a one-half-to-one flow ratio. Obviously, any desired flow ratio may be selected merely by properly positioning the bracket 136 and the diaphragm assembly 108 along the slide rods 140, 140.

With the tracking controller adapted for adjustability as described, it will be apparent that precise and accurate tracking can be provided for between flow conditions in a first or master duct and a second or tracking duct. Further, adjustability of flow ratios is easily and conveniently provided for in the mere adjustment of the diaphragm assembly 108 and its push rod 102 relative to the push rod 104. Still further, a plurality of tracking controllers may be employed with a single master controller or master duct in the manner illustrated and described for the single tracking controller 12.

We claim:

1. A tracking controller for use in an air conditioning system having first and second duct sections the latter with an associated damper for regulating air flow therethrough; said tracking controller comprising first and second sensors respectively for producing first and second flow variable signals responsive respectively to flow conditions in said first and second duct sections, first and second transducers respectively to receive said first and second signals and with output elements acting in opposition to each other, a signal comparison and transmitting means including a movable lever acted upon in opposition by said output elements and thus operable to receive and compare said two flow variable signals and to provide a resultant signal, a pneumatic actuator for said damper in said second duct section operable to receive said resultant signal and to position said damper in response thereto, and a bleed type control orifice operatively associated with said lever for provision of said resultant signal in pneumatic form for transmission to said actuator, said transducers each comprising housing and diaphragm assemblies mounted on a common base but with one of said transducer being adjustably mounted on the base for adjustment relative to the other of said transducers and said lever, the output member of said adjustable transducer being movable in one and an opposite direction along the length of said lever as a result of said adjustment of said adjustable transducer.

2. A tracking controller as set forth in claim 1 wherein said transducers each comprise housing and diaphragm assemblies mounted on a common base but with said adjustable transducer mounted on the base for slidable adjustment relative to said other transducer and said lever, the output member of said adjustable transducer being movable in one and an opposite direction along the length of said lever as a result of said slidable adjustment of said transducer.

* * * * *